United States Patent [19]
Chou

[11] Patent Number: 5,911,354
[45] Date of Patent: Jun. 15, 1999

[54] SOLDERING DEVICE FOR TERMINAL COMPONENTS WITH MULTIPLE LEGS

[76] Inventor: Jung-Kuang Chou, P. O. Box 82-144, Taipei, Taiwan

[21] Appl. No.: 08/720,037

[22] Filed: Sep. 27, 1996

[51] Int. Cl.⁶ ..................................................... B23K 3/00
[52] U.S. Cl. ............................ 228/6.2; 228/41; 228/44.7; 29/854
[58] Field of Search ............................... 228/6.1, 6.2, 41, 228/44.7, 49.5; 29/854

[56] References Cited

U.S. PATENT DOCUMENTS

| | | | |
|---|---|---|---|
| 5,415,338 | 5/1995 | Wilkes | 228/41 |
| 5,439,161 | 8/1995 | Kawatani et al. | 228/44.7 |

*Primary Examiner*—Samuel M. Heinrich
*Attorney, Agent, or Firm*—A & J

[57] ABSTRACT

A soldering device for terminal components with multiple legs including a holder formed thereon with a cavity and a plurality of connecting wire guiding grooves for receiving a terminal component and connecting wires and adapted to be fitted into a positioning opening of a frame, soldering means having a soldering iron formed at the lower end with a plurality of notches for receiving the legs of the terminal component and controlled by a timer to melt the tin solder for soldering the legs of the terminal component with the connecting wires, and pushing soldering process thereby enabling the products to be collected, whereby the soldering device utilizes lesser holders than the conventional device and is especially fit for use with a small amount of soldering work for terminal components and connecting wires with various kinds and specifications.

5 Claims, 4 Drawing Sheets

SOLDERING DEVICE FOR TERMINAL COMPONENTS WITH MULTIPLE LEGS

BACKGROUND OF THE INVENTION

1. Field of the Invention

This invention is related to a soldering device for terminal components with multiple legs and in particular to one provided with a soldering iron having notches which is the same as the legs of the terminal component in number and adapted to enclose legs of the terminal component and the connecting wires and automatically controlled to join the legs of the terminal component to the connecting wires with solder.

2. Description of the Prior Art

It has been found that most of the soldering works on the terminals of an electric component and connecting wires are soldered manually each by each by heating a rod-shaped soldering iron and tin and then covering the melting tin on the terminals of the electric component and connecting wires. Nevertheless, such a soldering method suffers from the following drawbacks.

1. As the terminals of an electric component must be soldered with the connecting wires one by one, the soldering work shall waste a lot of time thus increasing the manufacturing cost.
2. The rod-shaped soldering iron is too large in size and so it will be very difficult to extend into the dense space of terminals for soldering connecting wires on terminals of miniature electric components.
3. It is very hard to control the manual operation, temperature control and time needed for soldering. In case the temperature is too low or the time required for soldering is insufficient, the terminals of the electrical component will not be firmly engaged with the connecting wire.
4. The conventional mechanical soldering machines on the market are only designed for three dimensional soldering and is unfit for soldering connecting wires on terminals of an electrical component. According to such soldering machines, the tin is first heated at a point only and then the heat is transmitted to the rest of the tin thereby losing a lot of heat energy.

SUMMARY OF THE INVENTION

This invention is related to a soldering device for terminal components with multiple legs which includes a holder formed thereon with a cavity and a plurality of connecting wire guiding grooves for receiving a terminal component and connecting wires and adapted to be fitted into a positioning opening of a frame, soldering means having a soldering iron formed at the lower end with a plurality of notches for receiving the legs of the terminal component and controlled by a timer to melt the tin solder for soldering the legs of the terminal component with the connecting wires, and pushing means for pushing the holder out of the frame after soldering process thereby enabling the products to be collected, whereby the soldering device utilizes lesser holders than the conventional device and is especially fit for use with a small amount of soldering work for terminal components and connecting wires with various kinds and specifications.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Figure 1:
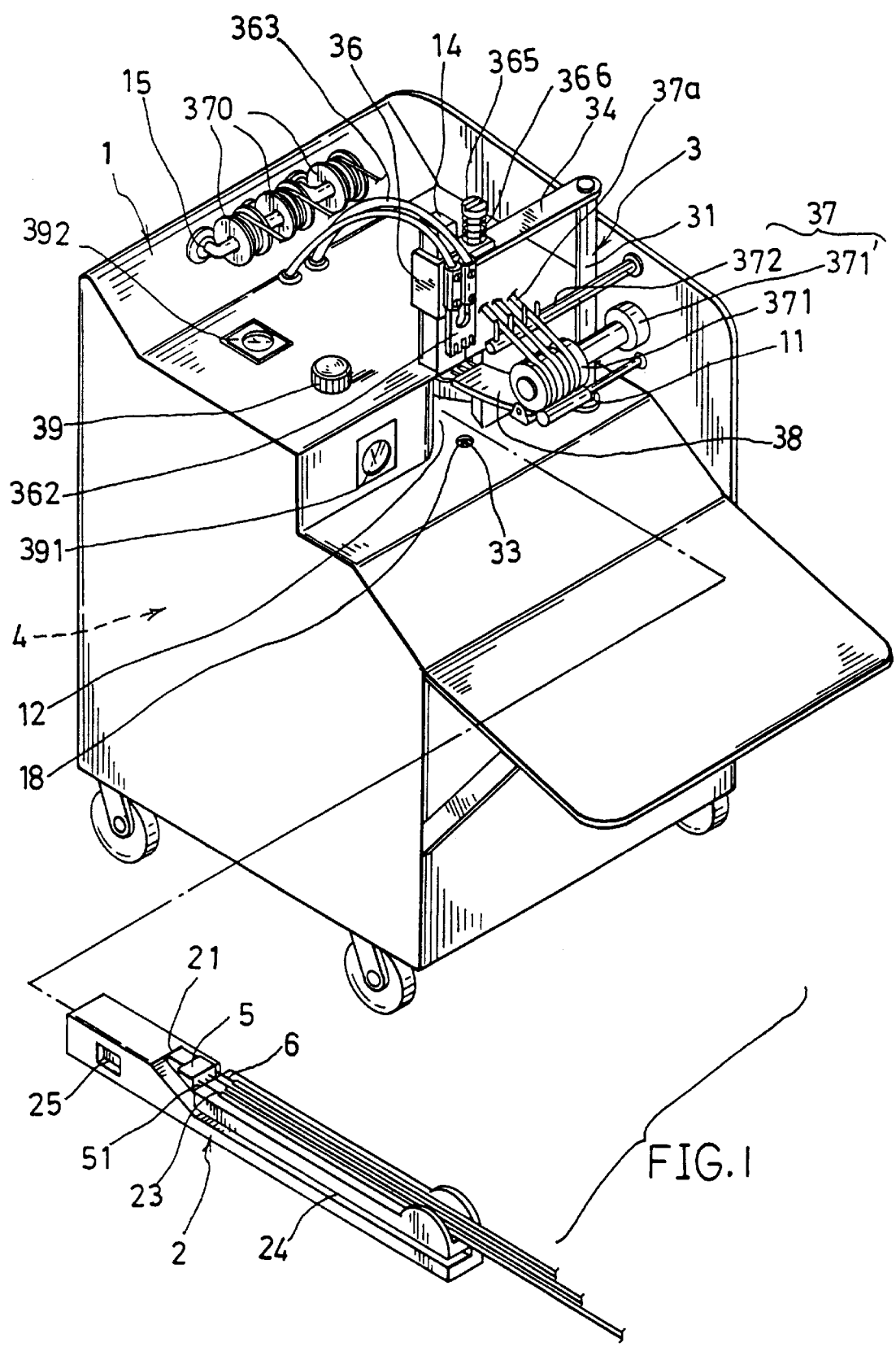
FIG. 1 is a perspective view of a soldering device for terminal components with multiple legs according to the present invention.

With reference to the drawings and in particular to FIG. 1 thereof, the soldering device for terminal components with multiple legs comprises a frame 1, at least a holder 2, soldering means 3 and pushing means 4.

The holder 2 is formed at an upper portion with a cavity 21 for receiving a terminal component 5 therein. An unloading mechanism 22 is mounted under the holder 2 and includes a pushrod 221 resiliently slidably fitted within a hole 211 at the bottom of the cavity 21 so that the terminal component 5 can be pushed upwardly out of the cavity 21 by the pushrod 221. The upper portion of the holder 2 is formed with a plurality of grooves 23 for receiving the legs 51 of the terminal component 5. A longitudinal recess 24 is formed at one side of the holder 2 and in communication with the cavity 21.

Figure 2:
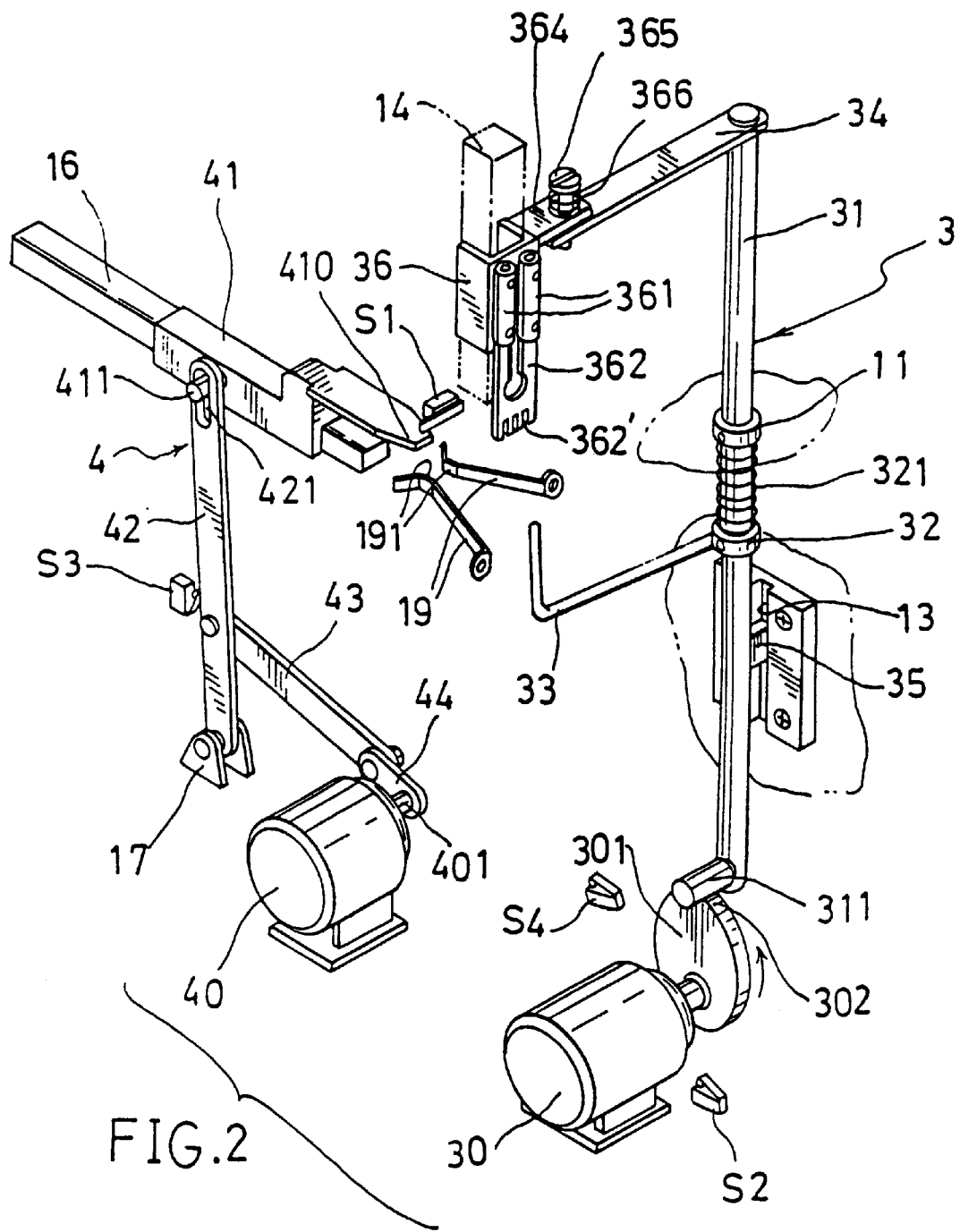
FIG. 2 is a perspective view illustrating the structure of the soldering means.
Figure 3:
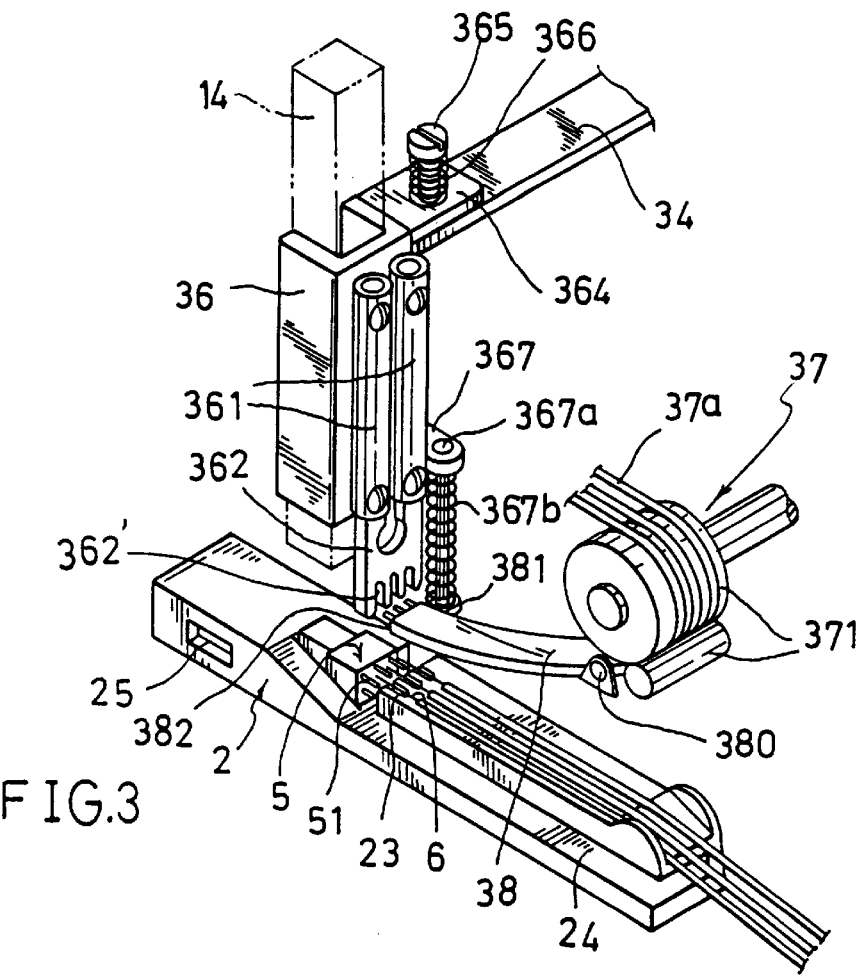
FIG. 3 illustrates the relationship between the soldering equipment and the holder.

The soldering means 3 is arranged on the frame 1 and includes a main rod 31 extending through a linear bearing 11 mounted on the frame 1 (see FIGS. 2 and 3). The lower end of the main rod 31 is provided with a roller 311 which is in contact with a cam 301 driven by a motor 30 so that when the motor 30 is turned on, the main rod 31 will be moved up and down. The motor 30 is electrically connected with a micro-switch S2 and a micro-switch S4 which is spaced apart from the micro-switch S2 by an angle of 270 degrees. Hence, the motor 30 will be started when the preset time is up and will keep rotating until the cam 302 gets in touch with the micro-switch S4 (see FIG. 1). Meanwhile, the main rod 31 will be moved together with the soldering iron 362 up and down. The micro-switches S4 and S2 are used for controlling the upward and downward strokes of the soldering iron 362, respectively. The means to control the motor 30 to rotate its output axle every time when the motor 30 is turned on may be of any design well known to those skilled in the art and is not considered a part of the invention. A fixed collar 32 is rigidly mounted on the intermediate portion of the main shaft 31 and located under the linear bearing 11. A spring 321 is arranged on the main rod 31 between the linear bearing 11 and the fixed collar 32 and tends to urge the main rod 31 to go downwardly via the fixed collar 32 thereby forcing the roller 311 to contact the cam 301 constantly. An end of a L-shaped unloading rod 33 is fixedly mounted on the main rod 31 so that the unloading rod 33 will be movable with the main shaft 31. The other end of the L-shaped rod 33 is arranged right under the pushrod 221 of the unloading mechanism 22 when the holder 2 is inserted into a positioning opening 12 of the frame 1. A linking member 34 is fixedly connected with an upper end of the main rod 31 at an end. A slide 35 is fixedly mounted on the main rod 31 and constantly engaged with a groove 13 of the frame 1. A sliding seat 36 is slidably engaged with a shaft 14 vertically mounted on the frame 1. A pair of tubular members 361 are fixedly mounted on one side of the sliding seat 36 and engaged with two legs of a soldering iron 362. Two electrical cables 363 extend through the tubular members 361 to engage with the soldering iron 362. The lower end of the soldering iron 362 is formed with a plurality of notches 362'. The sliding seat 36 is provided with a transverse arm 364 which is arranged on the other end of the linking member 34. A bolt 365 extends downwardly through a spring 366 into the linking member 34 thereby enabling the sliding seat 36 to move in unison with the main rod 31. A tin solder feeding mechanism 37 is arranged opposite to the sliding seat 36 and includes two rollers 371 which are rotatably mounted on the frame 1. The roller 371 at the upper position is driven by a motor 371'. A grid 372 is fixedly mounted on the frame 1 for guiding tin solder 37a from rolls 370 to the rollers 371. A tin solder guiding plate 38 is mounted at one end on a pivot 380 rotatably installed on the frame 1 and arranged between the soldering iron 362 and the rollers 371 for accurately guiding the tin solder 37a to the lower end of the soldering iron 362. The tin solder guiding plate 38 has a lug 381 close to its lower end.

The sliding seat 36 is provided at one side with a lug 367. Between the lug 367 of the sliding seat 36 and the lug 381 of the tin solder guiding plate 38 there is mounted a bolt 367a and a spring 367b enclosing the bolt 367a. Hence, the tin solder guiding plate 38 is movable with the sliding seat 36 or the pivot 380.

Figure 5:
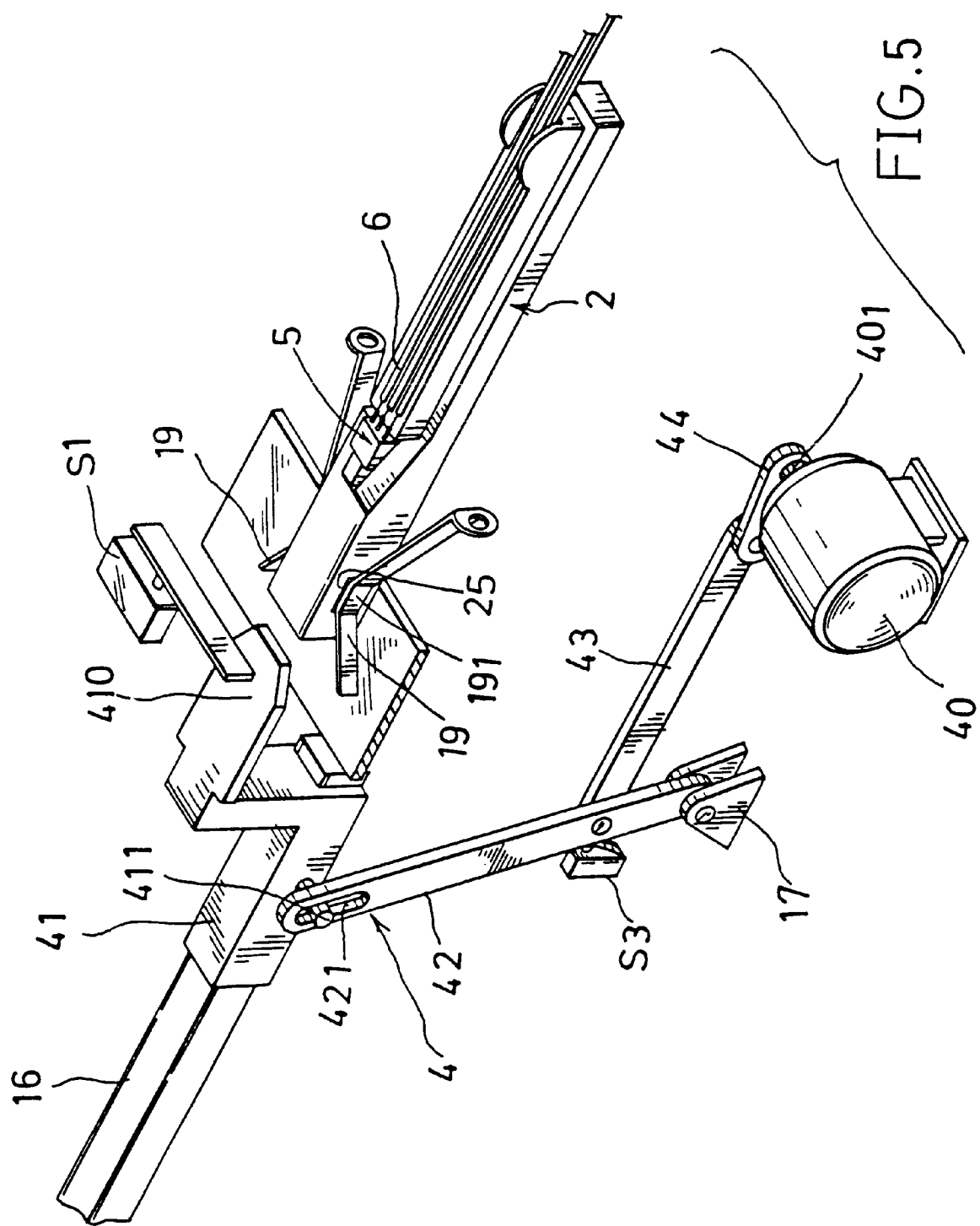
FIG. 5 is a perspective view of the pushing means.

The rollers 371 of the tin solder feeding mechanism 37 are preferably made of rubber, metal or the like. The pushing means 4 includes a driving slide 41 which slidably mounted on a rail 16 fixedly mounted on the frame 1 so that the front end of the driving slide 41 is aligned with the positioning opening 12 of the frame 1. The driving slide 41 is provided at one side with a pin 411 movably fitted with a slot 421 formed at an end of a rocking arm 42. The other end of the rocking arm 42 is pivotally connected with a pair of ears 17 of the frame 1. An end of a linking rod 43 is pivotally connected with the rocking arm 42, while another end of the linking rod 43 is pivotally connected with an end of a crank 44. The other end of the crank 44 is pivotally connected with an output axle 401 of a motor 40 so that when the motor 40 is turned on, the crank 44 will rotate the linking rod 43 and the rocking arm 42 thereby causing the driving slide 41 to reciprocate along the rail 16 (see FIG. 5).

Figure 4:
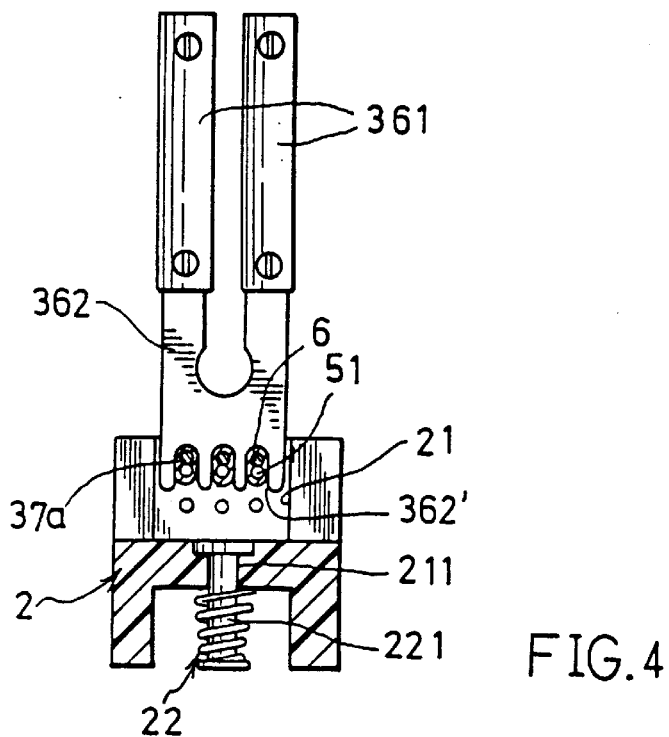
FIG. 4 is a sectional view illustrating how the terminal component is joined to the connecting wires with solder by the soldering iron.

When desired to solder the legs 51 of the terminal component 5 with the connecting wires 6, first insert the terminal component 5 into the cavity 21 of the holder 2 and arrange the connecting wires 6 into the grooves 23 (see FIG. 1) and then insert the holder 2 into the positioning opening 12 of the frame 1 so that the first micro-switch S1 is turned on by the front end of the holder 2 thereby turning on the motor 30 of the soldering means 3. Meanwhile, the legs 51 of the terminal component 5 in the holder 2 are located right under the notches 362' of the soldering iron 362. As the cam 301 driven by the motor 30 rotates to turn off the second micro-switch S2, the motor 30 will stop. In the meantime, the lobe of the cam 301 is located right under the roller 311 and the main rod 31 is urged by the spring 321 to go downwardly along the groove 13 of the frame 1. Hence, the sliding seat 36 of the soldering means 3 is also moved downwardly with the main rod 31 thereby causing the notches 362' of the soldering iron 362 on the sliding seat 36 to enclose the tin solder 37a, the connecting wires 6 and the legs 51 of the terminal component 5. A power source (not shown) is turned on to supply electricity to the soldering iron 362 via a variable resistor 39 and a voltage meter 391. Then, the soldering iron 362 is heated to melt the tin solder 37a to solder the legs 51 of the terminal component 5 with the connecting wires 6. A timer 392 is used for controlling the soldering time. As the preset time is up, the motor 30 will be turned on again to rotate through an angle of 270 degrees thereby moving the main rod 31 together with the sliding seat 36 to go upwardly and therefore lifting the soldering iron 362 and the tin solder guiding plate 38. Consequently, the L-shaped unloading rod 33 will be moved upwardly to push the pushrod 221 of the holder 2 thus pushing the terminal component 5 out of the holder 2 (see FIG. 4). Then, the main rod 31 is adjusted to move slightly downwardly to retract the unloading rod 33 into the frame 1 through a hole 18. Then, the motor 30 for the soldering means 3 stops, but the motor 40 for the pushing means 4 is turned to rotate the crank 44 through an angle of 360 degrees, which will in turn make the rocking arm 42 to drive the driving slide 41 to reciprocate along the rail 16 for a cycle. Hence, the front end of the driving slide 41 will push the holder 2 within the positioning opening 12 of the frame 1. When the rocking arm 42 contacts the third micro-switch S3 after reciprocating for a cycle, the motor 40 will be turned off and the work for the soldering the legs 51 of the terminal component 5 with the connecting wires 6 will be finished. The outlet of the tin solder guiding plate 38 is coated with a layer of heat resistant plastic, glass, porcelain or the like in order to prevent the tin solder from adhering thereto.

During soldering, the notches 362' of the soldering iron 362 must be in close contact with the upper portion of the tin solder 37a and must apply pressure onto the connecting wires 6 and the legs 51 of the terminal component 5 in order to obtain good soldering work. Hence, the operator may turn the bolt 365 on the transverse arm 364 so as to adjust the pressure designed for applying onto the connecting wires 6 and the legs 51 of the terminal component 5.

Within the positioning opening 12 of the frame 1 are mounted a pair of resilient arms 19 each having an inwardly protruded portion 191 adapted to engage with a recess 25 of the holder 2 (see FIGS. 2 and 5) thus facilitating the positioning of the holder 2.

Before the holder 2 is pushed out of the frame 1, the inclined edges at the front end of the driving slide 41 will first force the resilient arms 19 to move outwardly to release the holder 2 and so the holder 2 will be smoothly pushed out of the frame 1 by the driving slide 41.

In conclusion, the present invention has the following advantages over the prior art:

1. This invention is provided with a soldering iron having the characteristic of non-adhesion of tin solder thereby making it unnecessary to be cleaned.
2. The electric component and the connecting wires can be quickly and conveniently set in predetermined positions hence preventing the user's finger from getting hurt by the soldering iron.
3. The thermal conductivity is rapid and even and so this invention is fit for automatic engineering.
4. This invention can improve the soldering between the terminal component and the connecting wires so that the connecting wires will not disengage from the terminal components.
5. This invention can provide uniform and quality products.

6. The legs of a terminal component can be soldered with the connecting wires simultaneously thereby reducing the manufacturing cost.

7. This invention is especially fit for soldering works with different specifications.

I claim:

1. A soldering device for terminal components with multiple legs comprising:

a frame having a positioning opening;

at least a holder detachably fitted in said positioning opening of said frame and each formed with a cavity adapted to receive a terminal component and a plurality of guiding grooves adapted to receive connecting wires;

soldering means having at least a main rod slidably mounted on said frame, a soldering iron arranged on said main rod, and a cam drivingly connected with said soldering iron, a tin solder feeding mechanism mounted on said frame and having a tin solder guiding plate having an outlet coated with prevent from adhesive material; and pushing means including a driving slide engaged with a rail mounted on said frame, said driving slide having an end aligned with said positioning opening of said frame, a rocking arm formed at an end thereof with a slot engaged with a pin on one side of said driving slide, another end of said rocking arm being pivotally connected with a seat of said frame, a linking rod having an end pivotally connected with said rocking arm, and a crank having an end pivotally connected with another end of said linking rod.

2. The soldering device for terminal components with multiple legs as claimed in claim 1, wherein said holder is formed at a top thereof with a cavity for receiving a an electric component and an unloading mechanism having a pushrod resiliently slidably fitted in said cavity of said holder for pushing an electric component out of said cavity of said holder, said holder having a top formed with a plurality of grooves adapted to receive terminals of an electric component within said cavity of said holder and an elongated recess at one side for receiving connecting wires already soldered with said electric component.

3. The soldering device for terminal components with multiple legs as claimed in claim 1, wherein said soldering means comprises: a main rod vertically extending through a linear bearing of said frame, said main rod having a lower end pivotally connected with a roller in contact with a cam driven by a motor thereby causing said main rod to move upwardly and downwardly when said motor is turned on; a fixed collar rigidly mounted on an intermediate portion of said main rod and a spring arranged between said linear bearing and said fixed collar thus constantly forcing said roller to contact said cam; an unloading mechanism having an end fixedly connected with said main rod and another end located right below said pushrod of said holder inserted into said positioning opening of said holder; a linking rod having an end fixedly connected with an upper end of said main rod; a slide provided on said main rod and slidably engaged with a groove of said frame; a sliding seat slidably engaged with a vertical rail of said frame and provided at one side with two tubular members engaged with two legs of a soldering iron having a plurality of notches at a lower end thereof, said sliding seat having a transverse arm connected with said linking rod via a bolt enclosed with a spring; and a tin solder feeding mechanism including two feeding rollers pivotally mounted said frame and driven by a motor, a grid fixedly mounted on said frame for guiding tin solder to said rollers, and a tin solder guiding plate mounted at one end on a pivot rotatably installed on the frame 1 and arranged between said soldering iron and said rollers for accurately guiding said tin solder to a lower end of said soldering iron 362.

4. The soldering device for terminal components with multiple legs as claimed in claim 3, wherein said sliding seat of said soldering means is formed with a first lug at one side, said tin solder guiding plate has a second lug at one side which is located under said first lug, and a bolt enclosed with a spring extends downwardly through said first and second lugs.

5. The soldering device for terminal components with multiple legs as claimed in claim 1, wherein said frame is provided with a pair of resilient arms within said positioning opening, each of said resilient arms having an inwardly extending portion engageable with a recess at one side of said holder for facilitating positioning of said holder.

* * * * *